United States Patent
Han et al.

(10) Patent No.: US 10,904,119 B2
(45) Date of Patent: Jan. 26, 2021

(54) GENERATING SECURE NAME RECORDS

(71) Applicant: A10 NETWORKS, INC., San Jose, CA (US)

(72) Inventors: Liang Han, Pleasanton, CA (US); Yang Yang, San Jose, CA (US)

(73) Assignee: AIO Networks, Inc., San Jose, CA (US)

( * ) Notice: Subject to any disclaimer, the term of this patent is extended or adjusted under 35 U.S.C. 154(b) by 0 days.

(21) Appl. No.: 16/052,396

(22) Filed: Aug. 1, 2018

(65) Prior Publication Data
US 2018/0367430 A1  Dec. 20, 2018

Related U.S. Application Data

(63) Continuation of application No. 13/360,697, filed on Jan. 28, 2012, now Pat. No. 10,044,582.

(51) Int. Cl.
 *H04L 12/26* (2006.01)
 *H04L 29/12* (2006.01)
 *H04L 12/24* (2006.01)
 *H04L 12/64* (2006.01)

(52) U.S. Cl.
 CPC ...... *H04L 43/0817* (2013.01); *H04L 12/6418* (2013.01); *H04L 29/12066* (2013.01); *H04L 29/12594* (2013.01); *H04L 41/5058* (2013.01); *H04L 61/1511* (2013.01); *H04L 61/302* (2013.01); *H04L 61/609* (2013.01)

(58) Field of Classification Search
 CPC .......... H04L 61/1511; H04L 29/12066; H04L 43/0817; H04L 41/5058; H04L 61/302; H04L 29/12594; H04L 12/6418
 See application file for complete search history.

(56) References Cited

U.S. PATENT DOCUMENTS

| | | | | |
|---|---|---|---|---|
| 6,718,387 | B1* | 4/2004 | Gupta | H04L 29/06 370/397 |
| 2002/0010798 | A1* | 1/2002 | Ben-Shaul | H04L 29/12066 709/247 |
| 2004/0083306 | A1* | 4/2004 | Gloe | H04L 29/12066 709/245 |
| 2005/0044270 | A1* | 2/2005 | Grove | H04L 29/12018 709/238 |
| 2009/0222581 | A1* | 9/2009 | Josefsberg | H04L 67/1002 709/245 |
| 2010/0106833 | A1* | 4/2010 | Banerjee | H04L 29/12066 709/226 |

* cited by examiner

*Primary Examiner* — Philip J Chea
*Assistant Examiner* — Mohammed Ahmed
(74) *Attorney, Agent, or Firm* — Keith Kline; The Kline Law Firm PC

(57) ABSTRACT

Provided are a service gateway and a method for generating secure name records. The method may commence with receiving a name service request from a host. The name service request may include a name. The method may further include obtaining a service server name record from a name service server. The service server name record may include a plurality of name entries corresponding to the name. The method may then continue with generating a plurality of service gateway name records using the name and the plurality of name entries. The method may further include sending a service gateway name record of the plurality of service gateway name records to the host as a response to the name service request.

20 Claims, 5 Drawing Sheets

Steps to Generate Name Records 670

Step 1: Set M 913 = Number of entries in Name Entries 665
Step 2: Set N 911 = 1
Step 3: Set Capacity 329 = Capacity 327
Step 4: Set Name Records 670 = empty
Step 5: If (N 911 > M 913) Goto Step 16
Step 6: Set Name Entry Combinations 903 = a collection of name entry combinations of N 911 name entries out of the M 913 name entries in name entries 665.
Step 7: For each Name Entry Combination 905 in Name Entry Combinations 903
Step 8:     Generate a Name Record 606 using Name 404 and Name Entry Combination 905
Step 9:     Set Size 619 = Storage Size of Name Record 606
Step 10:    If Capacity 329 < Size 619 then Goto Step 16
Step 11:    Include Name Record 606 into Name Records 670
Step 12:    Decrement Capacity 329 by Size 619
Step 13: End For
Step 14: Increment N 911 by 1
Step 15: Goto Step 5
Step 16: Store Name Records 670 into Storage 315

FIG. 2A

GENERATING SECURE NAME RECORDS

CROSS REFERENCE TO RELATED APPLICATIONS

The present application is a continuation and claims the benefit of U.S. patent application Ser. No. 13/360,697, filed Jan. 28, 2012, now U.S. Pat. No. 10,044,582, entitled "Generating Secure Name Records", which is incorporated by reference herein in its entirety.

TECHNICAL FIELD

This present invention relates generally to data communications, and more specifically, to a service gateway.

BACKGROUND

Today Internet relies on a proper operating name services over the Internet, such as Domain Name System (DNS) services and other similar name services. These name services translate a service name, or a resource name into one or more network or service addresses corresponding to servers providing the service or resource. To ensure availability of the service or resource, it is common to have many servers offering the service or resource. Such availability may address one or more service problems such as server failure, server maintenance, network delays, network traffic congestion, service scaling with expected large numbers of service sessions, service restrictions to geographical areas, secure access for private networks, or other service considerations.

When a host sends a name service request, the response it receives may contain service addresses that are not appropriate for the host or the service name requested. For example, abc.com may have different services for different geographic location. A host on the East coast should be served by a resource server on the East coast, while hosts on the West coast should be served by servers on the West coast. In another example, movies.universal-studio.com has different distribution agreements with studios over different countries. Hosts from Japan should be directed to servers that enforces Japan's services. Hosts from Belgium should be directed to servers enforcing European services.

For example, a geo-location based name service gateway is deployed between a host and a name service server. The service gateway receives a response from the name service server. The service gateway filters the response according to a set of location based rules and the host before sending the modified response to the host. Typically, the service gateway stores the response and uses it to respond to another request for the same service or resource name from another host. The process allows the service gateway to use the same response for many name service requests. The process not only reduces the load onto the name service servers, but also improves the service quality the hosts receive.

However, this process does not work well with a secure name service, where the response from the name service server is encrypted and where the modified response needs to be encrypted before sending to the host. Decryption and encryption are computationally complex and consume valuable CPU cycles of the service gateway. The service quality offered by the service gateway would degrade during a busy period when a large number of name service requests are received by the service gateway over a short period of time. Busy periods are common in many networks and for many Internet services.

Therefore, there is a need for a method to generate a plurality of secure name records based on a name record response from a name service server so as to reduce the need to generate a secure modified response for each name service request.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for generating secure name records. According to one embodiment of the present disclosure, a method for generating secure name records is provided. The method may commence with receiving a name service request from a host. The name service request may include a name. The method may further include obtaining a service server name record from a name service server. The service server name record may include a plurality of name entries corresponding to the name. The method may continue with generating a plurality of service gateway name records using the name and the plurality of name entries. The method may further include sending a service gateway name record of the plurality of service gateway name records to the host as a response to the name service request.

According to another approach of the present disclosure, there is provided a service gateway. The service gateway may include a processor and a memory communicatively coupled to the processor and storing instructions executable by the processor. The processor of the service gateway may be configured to receive a name service request from a host. The name service request may include a name. The processor may be further configured to obtain a service server name record from a name service server. The service server name record may include a plurality of name entries corresponding to the name. The processor may be further configured to generate a plurality of service gateway name records using the name and the plurality of name entries. The processor may be further configured to send a service gateway name record of the plurality of service gateway name records to the host as a response to the name service request.

System and computer program products corresponding to the above-summarized methods are also described herein.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

FIGS. 2 and 2*a* illustrate an embodiment of a process to generate a plurality of name records according to the present invention.

DETAILED DESCRIPTION

Figure 1:
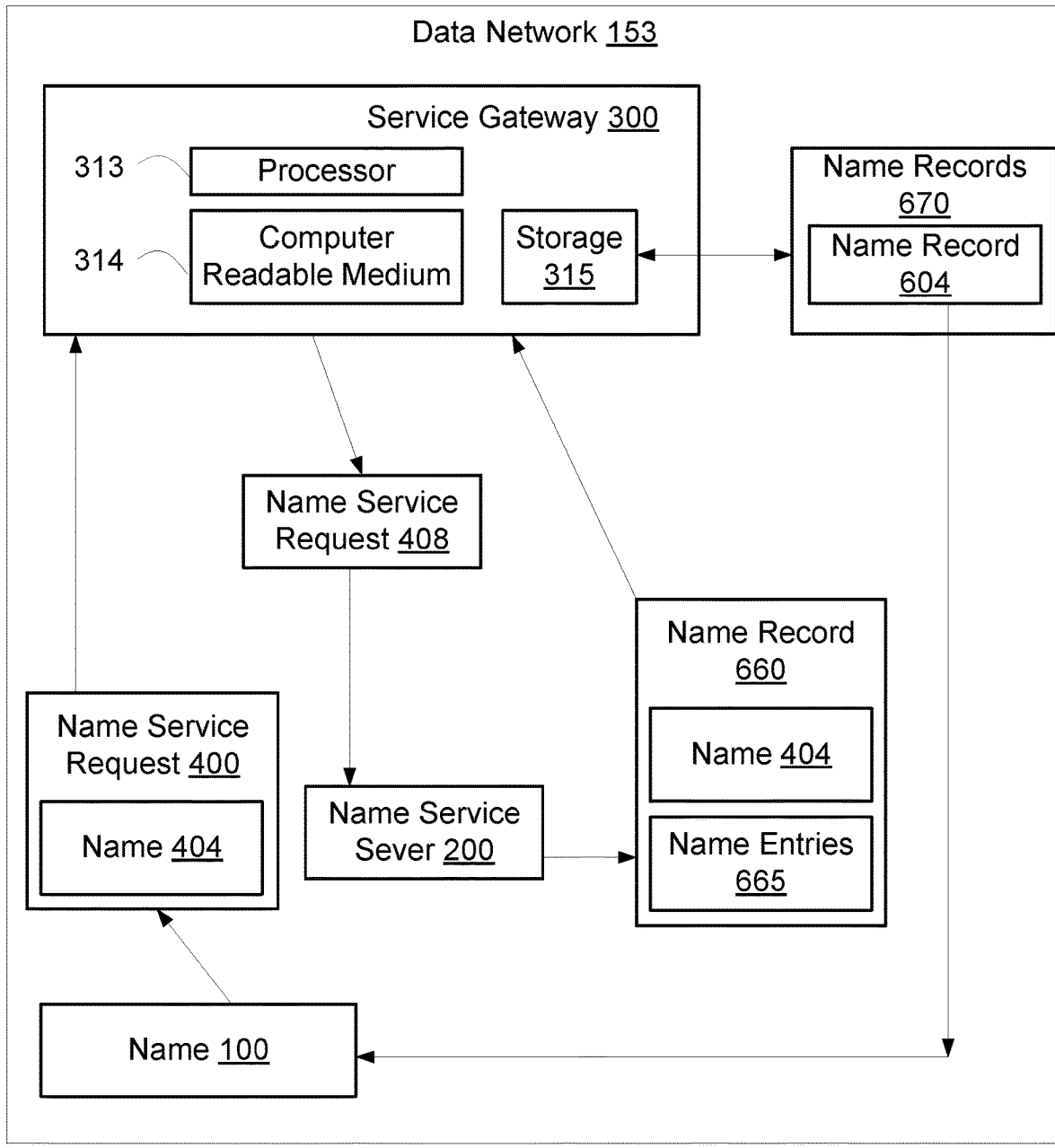
FIGS. 1 and 1*a* illustrate an embodiment of a service gateway servicing a name service request from a host according to the present invention.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport eh program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1A:
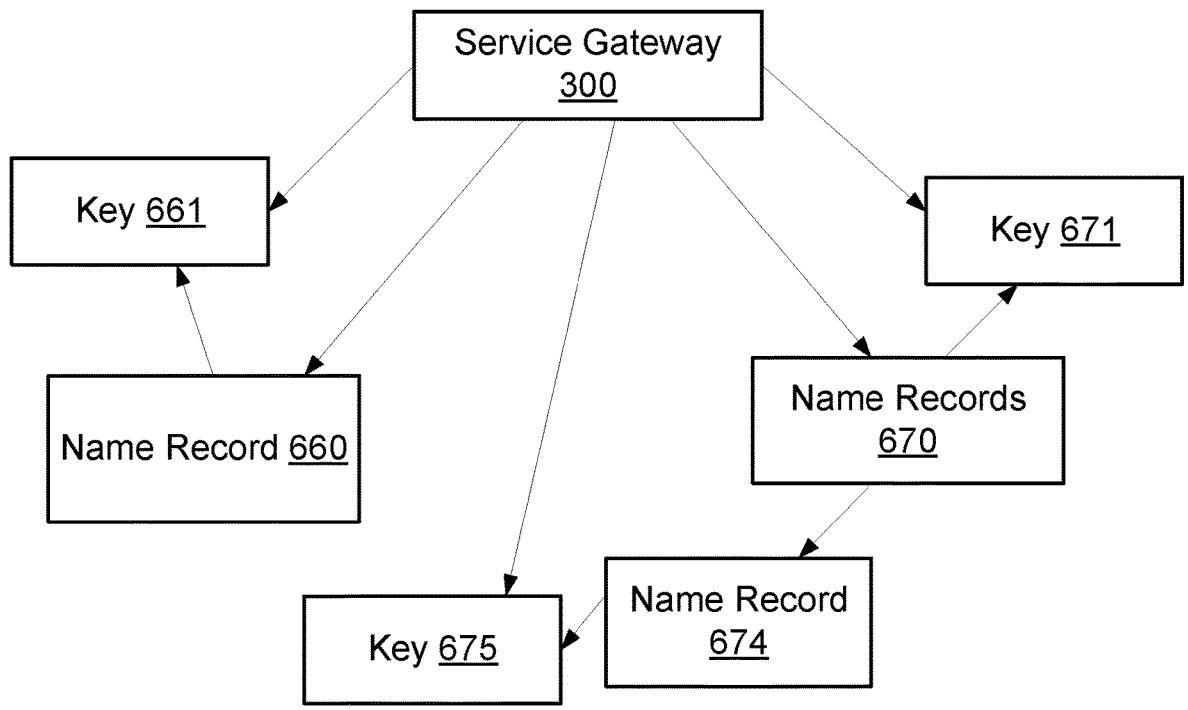

FIGS. 1 and 1a illustrate an embodiment of a name services service gateway servicing a name service request between a host and name service server according to the present invention. As illustrated in FIG. 1, host 100 sends a name service request 400 to a service gateway 300. In one embodiment, name service request 400 includes a Domain Name System (DNS) request, a request for a network address based on a name, a domain name, a machine name, a computer name, a computing device name, a service name, a resource identity or any network identity.

Host 100 is typically a computing device with network access capabilities. In one embodiment, host 100 is a workstation, a desktop personal computer or a laptop personal computer, a Personal Data Assistant (PDA), a tablet computing device, a smartphone, or a cellular phone, a set-top box, an Internet media viewer, an Internet media player, a smart sensor, a smart medical device, a net-top box, a networked television set, a networked DVR, a networked Blu-ray player, or a media center.

Service gateway 300 is a computing device operationally coupled to a processor 313 and a computer readable medium 314. The computer readable medium 314 stores computer readable program code, which when executed by the processor 313, implements the various embodiments of the present invention as described herein. In some embodiments, service gateway 300 is implemented as a server load balancer, an application delivery controller, a service delivery platform, a traffic manager, a security gateway, a component of a firewall system, a component of a virtual private network (VPN), a load balancer for video servers, a gateway for network address translation, a DNS server, a geo-location based name server, or a gateway enforcing access policies based on location information. Typically service gateway 300 includes functionality to provide name services to host 100.

Service gateway 300 receives name service request 400 and obtains a name 404 from name service request 400. In one embodiment, name 404 includes a domain name such as "www.abc.com", a computer name such as "yoda", a network device name such as "router1456", a service name such as "mail-service.anyisp.biz", a network resource name "apn.mobile-network.net" or "music-storage.private-network", or a computer name such as "john-laptop5".

In one embodiment, service gateway 300 uses name 404 to create a name service request 408, and sends the name service request 408 to a name service server 200. In response, the service gateway 300 receives a name service server name record 660 from the name service server 200, which contains one or more name entries 665 corresponding to name 404. Service gateway 300 receives name record 660 and obtains name entries 665 from name record 660.

In one embodiment, name service server 200 is a DNS server or a global service load balancer. In one embodiment, name service server 200 is a network computing device capable of processing name service request 408. In one embodiment, name service server 200 includes a software program residing in a network computing device where the software program processes name service request 408.

In one embodiment, service gateway 300 includes functionality of name service server 200. In this embodiment, the name service server 200 component of service gateway 300 processes name service request 408 and responds with name record 660. In another embodiment, the name service server 200 component of service gateway 300 does not require name service request 408 and processes name 404 to respond with name record 660.

Using name 404 and the name entries 665, service gateway 300 generates a plurality of service gateway name records 670. In one embodiment, service gateway 300 stores name records 670 in storage 315. Service gateway 300 selects a name record 604 of name records 670 and sends name record 604 to host 100 as a response to name service request 400.

In one embodiment as illustrated in FIG. 1a, name record 660 is encrypted, for example, using a public key encryption method. Service gateway 300 obtains a key 661, based on information of name record 660 and name service server 200. Service gateway 300 uses key 661 to decode name record 660 and obtains name entries 665.

In one embodiment, service gateway 300 encrypts name records 670. Service gateway 300 obtains a key 671 and uses key 671 to encrypt all the name records in name records 670. In one embodiment, for each name record 674 in name records 670, service gateway 300 obtains a separate key 675 to encrypt name record 674.

In one embodiment, service gateway 300 obtains key 661, key 671 or key 675 from a server computer in a data network. In one embodiment, service gateway 300 obtains the keys from storage 315.

In one embodiment, name records 670 include an unencrypted copy of name record 604 for use in comparison operations and an encrypted copy of name record 604. In one embodiment, service gateway 300 sends the encrypted copy of name record 604 to host 100 as a response to name service request 400.

In another embodiment in FIG. 1, service gateway 300 generates name records 670 from a prior name service request, and stores name records 670 in storage 315. In response to receiving a subsequent name service request 400, service gateway 300 obtains name 404 from name service request 400. Service gateway 300 compares the name 404 against name records in the storage 315 and determines there is a match with name records 670. Service gateway 300 selects a matching name record 604 from name records 670, and sends name record 604 to host 100 as a response to name service request 400. In this embodiment, the service gateway 300 avoids creating a name service request to be sent to the name service server 200.

In one embodiment, service gateway 300 does not find a match for the name 404 in the name records in the storage 315. In response, service gateway 300 proceeds to generate name service request 408 to be sent to name service server 200.

Figure 2:
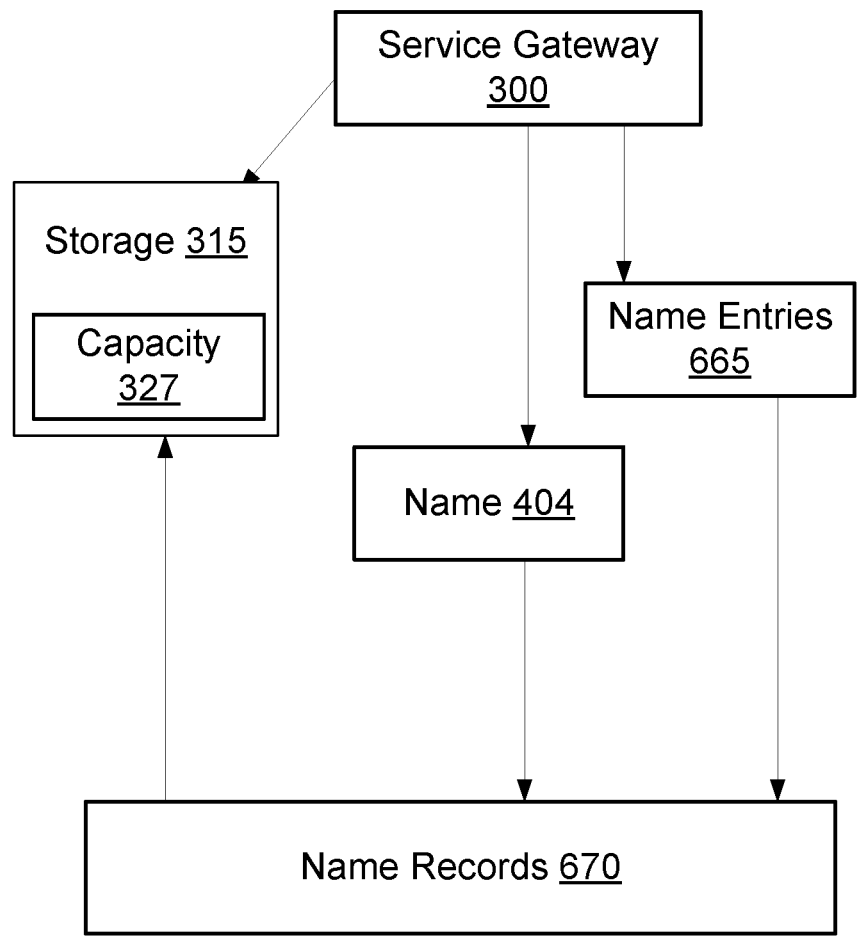

FIGS. 2 and 2a illustrate an embodiment of a process to generate service gateway name records 670 according to the present invention. As illustrated in FIG. 2, service gateway 300 generates name records 670 using name entries 665 and name 404. Service gateway 300 stores generated name records 670 in storage 315. In one embodiment, service gateway 300 limits the storage area for name records 670 within a capacity 327 of the storage 315. Service gateway 300 generates a name record using name 404 and one or more entries in name entries 665. FIG. 2a illustrates steps of a method to generate one or more name records with one or more entries in name entries 665.

Step 1: Set M 913=number of entries in Name Entries 665
    Step 2: Set N 911=1
    Step 3: Set Capacity 329=Capacity 327
    Step 4: Set Name Records 670=empty
    Step 5: If (N 911>M 913) Goto Step 16
    Step 6: Set Name Entry Combinations 903=a collection of name entry combinations of N 911 name entries out of the M 913 name entries in name entries 665.
    Step 7: For each Name Entry Combination 905 in Name Entry Combinations 903
    Step 8: Generate a Name Record 606 using Name 404 and Name Entry Combination 905
    Step 9: Set Size 619=Storage Size of Name Record 606
    Step 10: If Capacity 329<Size 619 then Goto Step 16
    Step 11: Include Name Record 606 into Name Records 670
    Step 12: Decrement Capacity 329 by Size 619
    Step 13: End For
    Step 14: Increment N 911 by 1
    Step 15: Goto Step 5
    Step 16: Store Name Records 670 into Storage 315

In an embodiment, name entries 665 include 5 name entries {A, B, C, D, E}. In an embodiment of step 6 where N 911=1, Name Entry Combinations 903 may include {{A}, {B}, {C}, {D}, {E}}. In one embodiment of step 6 where N 911=2, Name Entry Combinations 903 may include {{A, B}, {A, C}, {A, D}, {A, E}, {B, C}, {B, D}, {B, E}, {C, D}, {C, E}, {D, E}}. In one embodiment of step 6 where N 911 is being 4, Name Entry Combinations 903 may include {{A, B, C, D}, {A, B, C, E}, {A, B, D, E}, {A, C, D, E}, {B, C, D, E}}. In one embodiment, Name Entry Combinations 903 may include {{A, B, D, E}, {A, C, D, E}, {B, C, D, E}}. In one embodiment, Name Entry Combinations 903 may not include all possible name entry combinations of N 911 entries from M 913 entries. In one embodiment, service gateway 300 creates Name Entry Combinations 903 based on a service policy such as a location-based policy, a traffic management policy or a security policy. For example, if a given Name Entry Combination is determined to violate the service policy, a name record is not created for the given Name Entry Combination.

In one embodiment, name entries 665 include a specific order for the M 913 entries. Name Entry Combinations 903 include a collection of ordered combinations of N 911 entries.

In one embodiment, N 911 in step 2 is set to M 913 and N 911 is decremented by 1 in step 14. In this embodiment, the test in step 5 changed to "if (N 911<=0)".

Figure 3:
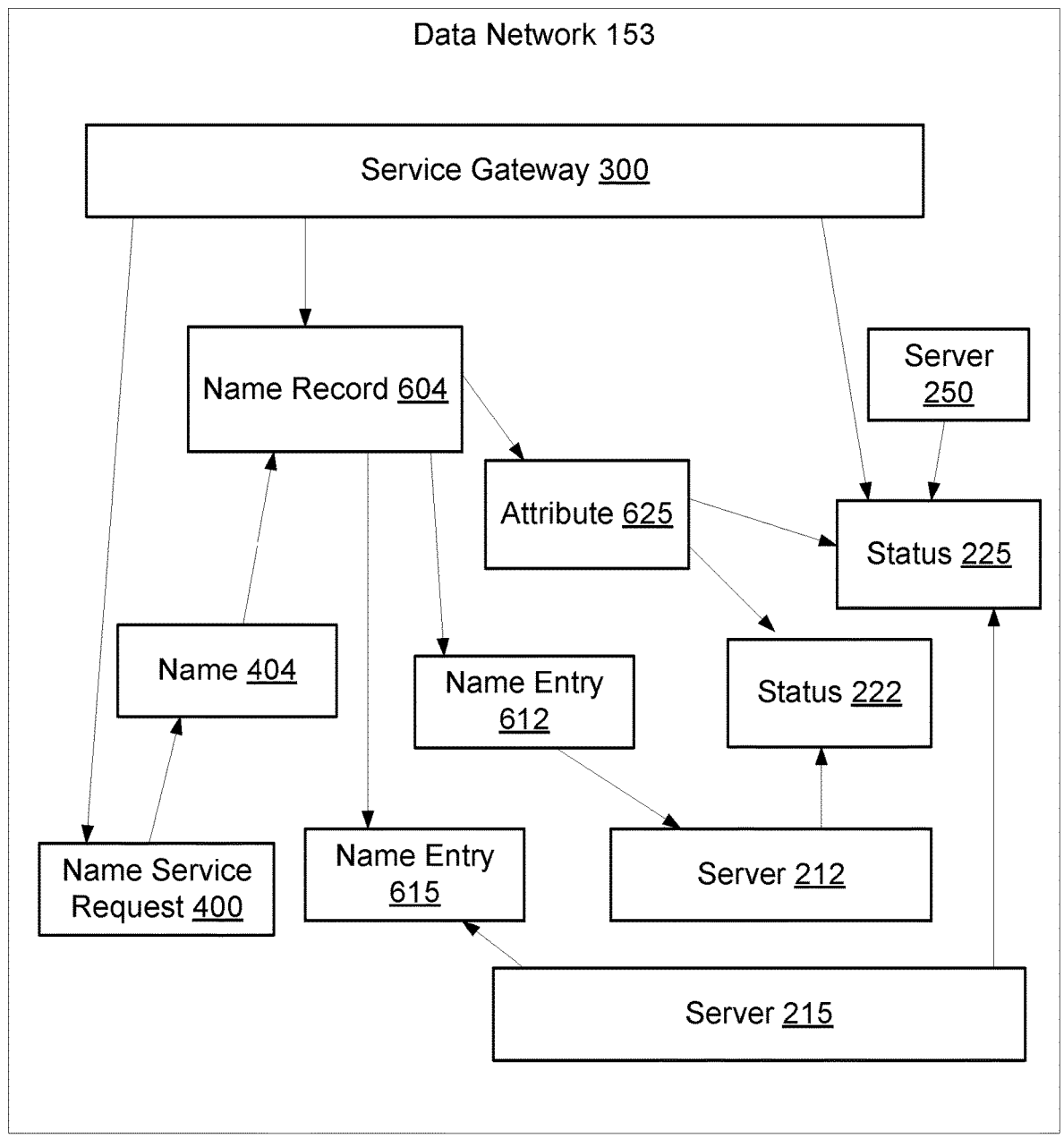
FIG. 3 illustrates an embodiment of a process to select a name record based on availability status of a server according to the present invention.

In one embodiment as illustrated in FIG. 3, service gateway 300 obtains availability status 225 for server 215.

Server 215 is a network computer corresponding to name entry 615. In one embodiment, server 215 is a computing device such as a Web server, a file server, a video server, a database server, an application server, a voice system, a conferencing server, a media gateway, a SIP server, a remote access server, a VPN server, a media center, an app server or a network server providing a network or application service to host 100.

Status 225 is an indication whether server 215 is available for service. In one embodiment, server 215 is disconnected from network, busy, overload, or under maintenance, does not have necessary software or hardware component, shutdown, not running, or other undesirable condition preventing server 215 from providing services. Status 225 indicates unavailability of server 215.

In one embodiment, service gateway 300 obtains status 225 from server 215 in a communication channel or a communication session over data network 153 with server 215. In one embodiment, service gateway 300 obtains status 225 from another network computer 250 such as a network management system or a network administrative system.

In one embodiment, status 225 indicates server 215 is available. In one embodiment, server 215 resumes operation after maintenance, or after installation of a piece of software or a hardware component. In another embodiment, server 215 becomes available when the CPU load is low, or when server 215 is connected to network. In one embodiment, server 215 indicates availability status in status 225 when there is no change to availability from a previously communicated status.

In one embodiment, service gateway 300 connects to server 215 which is corresponded to a name entry 615. Name entry 615 is used in a generated name record 604. In one embodiment, name record 604 is associated with an attribute 625, which is included in service gateway 300. Service gateway 300 stores status 225 in attribute 625. Service gateway 300 checks status 225 of server 215 from time to time. In one embodiment, service gateway 300 checks periodically such as every 5 minutes, every hour, or every 10 seconds. In one embodiment, service gateway 300 receives an updated status 225 whenever there is a change to server 215. Service gateway stores updated status 225 in attribute 625.

During the processing of name 404 of name service request 400, as illustrated in FIGS. 1 and 1a, service gateway 300 determines a name in name record 604 matches name 404. Service gateway 300 further examines attribute 625 of name record 604. If attribute 625 indicates status 225 of server 215 is not available, service gateway 300 does not select name record 604 as a response to name service request 400.

In one embodiment, service gateway 300 determines status 225 in attribute 625 indicates server 215 is available. Service gateway 300 selects name record 604 as a response to name service request 400.

In one embodiment, name record 604 includes a second name entry 612 corresponding to server 212 and status 222 corresponding to server 212. In one embodiment, service gateway 300 also stores status 222 in attribute 625. Service gateway 300 examines attribute 625 for status 225 and status 222. In one embodiment, status 222 and status 225 indicate server 212 and server 215 are available respectively, service gateway 300 selects name record 604 as a response to name service request 400. In one embodiment, one of status 222 or status 225 indicates unavailability. Service gateway 300 does not select name record 604 as a response.

In one embodiment, attribute 625 includes statuses associating to servers for all name entries in name record 604. Service gateway 300 examines all the statuses for availability before selecting name record 604 as a response to name service request 400.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A service gateway, comprising:
a processor; and
a memory communicatively coupled to the processor, the memory storing instructions executable by the processor, the processor being configured to:
receive a name service request from a host, the name service request comprising a name;
obtain a service server name record from a name service server, the service server name record comprising a plurality of name entries corresponding to the name, each of the plurality of name entries comprising the name and a network address of one of a plurality of servers providing a service associated with the name;
generate a plurality of service gateway name records using the name and the plurality of name entries, each of the plurality of service gateway name records differing from one another and including the name and one of the plurality of name entries;
encrypt each of the plurality of service gateway name records by using a separate encryption key for the each of the plurality of service gateway name records to obtain a plurality of encrypted service gateway name records;
store a copy of each of the plurality of service gateway name records in an unencrypted form;
send a service gateway name record of the plurality of encrypted service gateway name records to the host as a response to the name service request;
receive a subsequent name service request from the host, the subsequent name service request comprising the name; and
compare the copy of each of the plurality of service gateway name records in the unencrypted form with the name to select one of the plurality of service gateway name records corresponding to the name;
select one of the plurality of encrypted service gateway name records corresponding to the one of the plurality of service gateway name records in the unencrypted form;
send a further service gateway name record to the host as a response to the subsequent name service request, wherein the further service gateway name record is the one of the plurality of encrypted service gateway name records generated in response to the name service request.

2. The service gateway of claim 1, wherein the processor is configured to obtain the service server name record by:
creating a further name service request using the name;
sending the further name service request to the name service server; and receiving a response to the further name service request from the name service server, the response comprising the service server name record.

3. The service gateway of claim 1, wherein the processor is further configured to:
   compare the name against the plurality of service gateway name records; and
   determine a match with the further service gateway name record of the plurality of service gateway name records.

4. The service gateway of claim 3, wherein the processor is further configured to:
   in response to determining no match with the plurality of service gateway name records, create the further name service request using the name.

5. The service gateway of claim 1, wherein the processor is configured to generate the plurality of service gateway name records by:
   determining a number of name entry combinations as N out of the M name entries obtained from the name service server;
   creating a first service gateway name record using the name and a given name entry combination; and
   creating a second service gateway name record using the name and another name entry combination, according to a storage capacity of the service gateway.

6. The service gateway of claim 5, wherein the creating of the service gateway name record comprises:
   creating the first service gateway name record using the name and the given name entry combination according to a service policy.

7. The service gateway of claim 1, wherein the processor is configured to perform the sending by:
   determining a status of at least one server corresponding to the service gateway name record; and
   in response to determining that the status indicates that the at least one server is available, sending the service gateway name record to the host as the response to the name service request.

8. The service gateway of claim 7, wherein the sending further comprises:
   in response to determining that the status indicates that the at least one server corresponding to the service gateway name record is unavailable, not sending the service gateway name record to the host.

9. The service gateway of claim 1, wherein the processor is configured to perform the sending of the service gateway name record by:
   encrypting the service gateway name record; and
   sending the encrypted service gateway name record to the host as the response to the name service request.

10. A method for generating secure name records, the method comprising:
    receiving, by a processor associated with a service gateway, a name service request from a host, the name service request comprising a name;
    obtaining, by the processor, a service server name record from a name service server, the service server name record comprising a plurality of name entries corresponding to the name, each of the plurality of name entries comprising the name and a network address of one of a plurality of servers providing a service associated with the name;
    generating, by the processor, a plurality of service gateway name records using the name and the plurality of name entries, each of the plurality of service gateway name records differing from one another and including the name and one of the plurality of name entries;
    encrypting, by the processor, each of the plurality of service gateway name records by using a separate encryption key for the each of the plurality of service gateway name records to obtain a plurality of encrypted service gateway name records;
    storing, by the processor, a copy of each of the plurality of service gateway name records in an unencrypted form;
    sending, by the processor, a service gateway name record of the plurality of encrypted service gateway name records to the host as a response to the name service request;
    receiving, by the processor, a subsequent name service request from the host, the subsequent name service request comprising the name; and
    comparing, by the processor, the copy of each of the plurality of service gateway name records in the unencrypted form with the name to select one of the plurality of service gateway name records corresponding to the name;
    selecting, by the processor, one of the plurality of encrypted service gateway name records corresponding to the one of the plurality of service gateway name records in the unencrypted form;
    sending, by the processor, a further service gateway name record to the host as a response to the subsequent name service request, wherein the further service gateway name record is the one of the plurality of encrypted service gateway name records generated in response to the name service request.

11. The method of claim 10, wherein the obtaining comprises:
    creating a further name service request using the name;
    sending the further name service request to the name service server; and
    receiving a response to the further name service request from the name service server, the response comprising the service server name record.

12. The method of claim 10, further comprising:
    comparing the name against the plurality of service gateway name records; and
    determining a match with the further service gateway name record of the plurality of service gateway name records.

13. The method of claim 12, further comprising:
    in response to determining no match with the plurality of service gateway name records, creating the further name service request using the name.

14. The method of claim 10, wherein the generating further comprises:
    determining a number of name entry combinations as N out of the M name entries obtained from the name service server;
    creating a first service gateway name record using the name and a given name entry combination; and
    creating a second service gateway name record using the name and another name entry combination, according to a storage capacity of the service gateway.

15. The method of claim 14, wherein the creating of the first service gateway name record further comprises:
    creating the first service gateway name record using the name and the given name entry combination according to a service policy.

16. The method of claim 14, wherein the name entry combinations comprise an ordered number of the name entry combinations.

17. The method of claim 10, wherein the sending of the service gateway name record comprises:
  determining a status of at least one server corresponding to the service gateway name record;
  in response to determining that the status indicates that the at least one server is available, sending the service gateway name record to the host as the response to the name service request.

18. The method of claim 17, wherein the sending further comprises:
  in response to determining that the status indicates that the at least one server corresponding to the service gateway name record is unavailable, not sending the service gateway name record to the host.

19. The method of claim 10, wherein the sending of the service gateway name record comprises:
  encrypting the service gateway name record; and
  sending the encrypted service gateway name record to the host as the response to the name service request.

20. A service gateway, comprising:
  a processor; and
  a memory communicatively coupled to the processor, the memory storing instructions executable by the processor, the processor being configured to:
    receive a name service request from a host, the name service request comprising a name;
    obtain a service server name record from a name service server, the service server name record comprising a plurality of name entries corresponding to the name, each of the plurality of name entries comprising the name and a network address of one of a plurality of servers providing a service associated with the name, the obtaining of the service server name record includes:
      creating a further name service request using the name;
      sending the further name service request to the name service server; and
      receiving a response to the further name service request from the name service server, the response comprising the service server name record;
    generate a plurality of service gateway name records using the name and the plurality of name entries, each of the plurality of service gateway name records differing from one another and including the name and one of the plurality of name entries;
    encrypt each of the plurality of service gateway name records by using a separate encryption key for the each of the plurality of service gateway name records to obtain a plurality of encrypted service gateway name records;
    store a copy of each of the plurality of service gateway name records in an unencrypted form;
    send a service gateway name record of the plurality of encrypted service gateway name records to the host as a response to the name service request;
    receive a subsequent name service request from the host, the subsequent name service request comprising the name;
    compare the name against the plurality of service gateway name records; and
    compare the copy of each of the plurality of service gateway name records in the unencrypted form with the name to select one of the plurality of service gateway name records corresponding to the name;
    select one of the plurality of encrypted service gateway name records corresponding to the one of the plurality of service gateway name records in the unencrypted form;
    in response to determining a match with a further service gateway name record of the plurality of service gateway name records, send the further service gateway name record to the host as a response to the subsequent name service request, wherein the further service gateway name record is the one of the plurality of encrypted service gateway name records generated in response to the name service request.

* * * * *